Sept. 11, 1923.  1,467,694
E. G. SHORTT
FLUID PRESSURE BRAKE MECHANISM
Filed Nov. 10, 1922
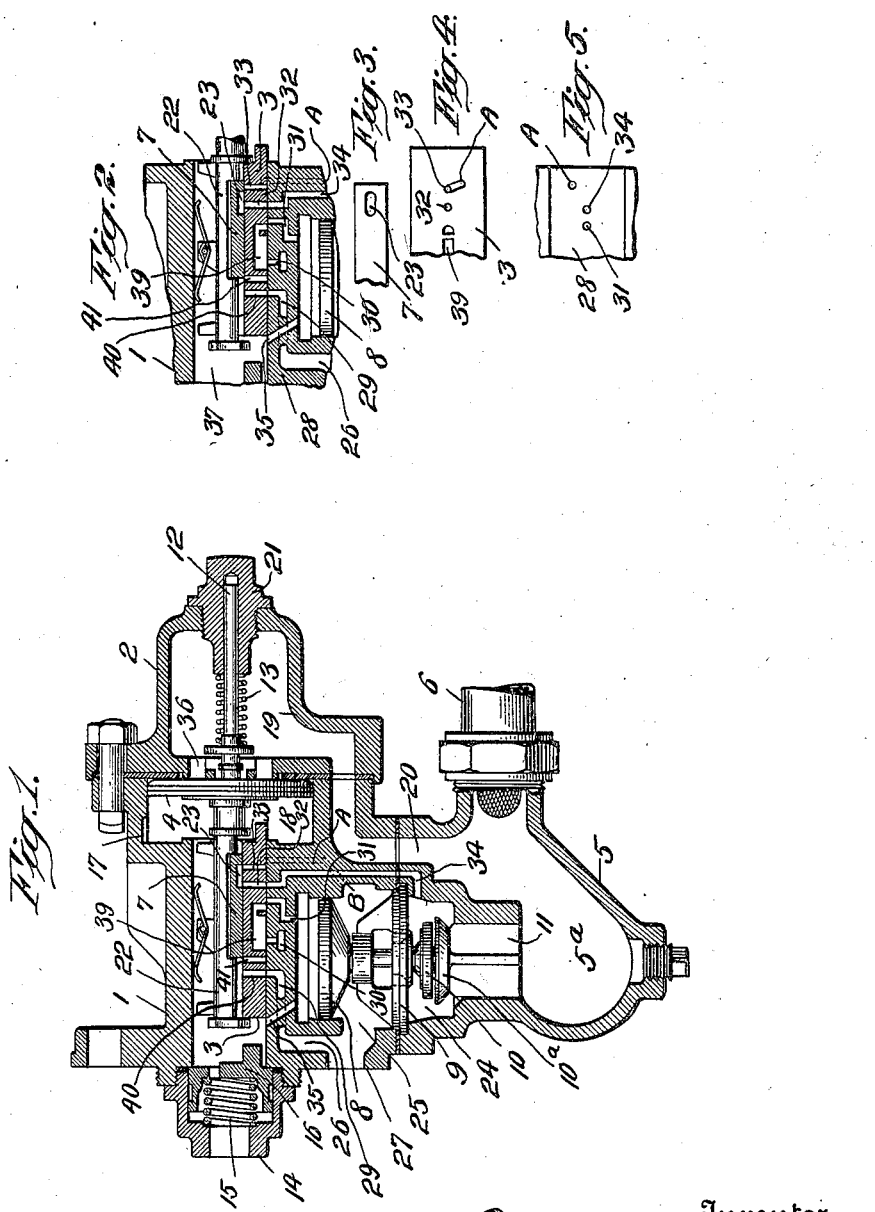

Patented Sept. 11, 1923.

1,467,694

UNITED STATES PATENT OFFICE.

EDWARD G. SHORTT, OF CARTHAGE, NEW YORK.

FLUID-PRESSURE BRAKE MECHANISM.

Application filed November 10, 1922. Serial No. 600,077.

*To all whom it may concern:*

Be it known that I, EDWARD G. SHORTT, a citizen of the United States, and resident of Carthage, in the county of Jefferson and State of New York, have invented certain new and useful Improvements in Fluid-Pressure Brake Mechanism, of which the following is a specification, reference being had therein to the accompanying drawing.

My present invention relates to certain new and useful improvements in equilibrio fluid pressure brake mechanisms, and more particularly to novel details in the structure and operation of the triple valve, whereby fluid pressure may be controlled and delivered to the brake cylinders and auxiliary reservoirs while the brakes are set after an emergency application.

A leading object of the invention, therefore, among many that may be mentioned is to provide the auxiliary reservoirs and brake cylinders with an abundant new supply of restored air pressure for service and other use immediately after there has been a heavy exigent demand upon the pressure in these parts for the purpose of an emergency application, at which time there is often a deficiency in the air supply, which deficiency causes many an alarming accident because there is no pressure for use in stopping or holding a train immediately following the use of so much air for emergency application, as for example when the train has made an emergency stop on a heavy grade. With my improvements a train may be held on any grade indefinitely at the will of the engineer. The improvements are therefore associated more particularly with the emergency appliances.

Leading features of the invention consist in means for instantly reinforcing the brake cylinder and auxiliary reservoirs following an emergency application, thus establishing equal pressure in every brake cylinder in the train, such means maintaining a running feed of air to the brake cylinders and auxiliary reservoirs while brakes are set. Since equal pressure will be established in every brake cylinder, every brake shoe will be caused to do its equally allotted share in retarding the train. In other words, the power is graduated at the will of the engineer to the pressure required. As the cylinders are equally charged a much smoother release is effected and all jerky action eliminated. All this I accomplish by the addition of simple and inexpensive features to what is commonly referred to as standard air brake equipment, particularly of the Westinghouse type, so that present accepted and successful mechanisms may still be preserved in use without loss or essential modification, with the gain of very great advantages, at a very trifling cost for such added features, not amounting perhaps to more than twenty-five cents for each car equipment. Further the invention may be said to consist essentially in the construction, arrangement and combination of parts, substantially as will be hereinafter described and claimed.

In the annexed drawing illustrating my invention;

Figure 1 is a vertical section of a standard Westinghouse triple valve, with my present improved running feed devices applied thereto.

Figure 2 is a partial sectional view of the same with the parts slightly changed in position.

Figure 3 is a detail bottom plan view of a part of the graduating valve.

Figure 4 is a detail bottom plan view of a part of the slide valve.

Figure 5 is a detail top plan view of the slide valve seat opposite the face shown in Figure 4.

Similar characters of reference designate corresponding parts throughout the different figures of the drawing.

I have shown my present improvements as applied to a Westinghouse standard triple valve. But it will be understood that I am not limited to this triple device, or to any other narrow field; as the essential feature of my invention may be combined and used with any other air brake structure having a combination of parts for which it may be suitable. In order to explain its function, purpose and utility I will first briefly describe the construction and operation of the standard device illustrated in the drawing, such being done for explanatory reasons merely. The disclosure of the standard well known device, however, both in the drawing and in my description is only full enough to lay a foundation for the description of my present invention and all unnecessary detail has been omitted.

1 denotes the triple valve casing, which may be of any shape, size, and contour. Secured thereto is the cap 2 having inner chamber 19, and also the bottom casting 5 having inner chamber 5ª, from which passage 20 leads to cap chamber 19, to which casing 5 the brake pipe 6 is connected. Casing 1 also has an opening 14 leading to the auxiliary reservoir, and an opening 27 leading to the brake cylinder. The stationary casting 28 within casing 1 furnishes a seat for the slide valve and is provided with suitable ports and passages as I shall show. 3 denotes the slide valve; 7 the graduation valve; 4 the main piston having rod 22 engaging and moving the slide valve 3 and graduation valve 7, and acting with graduation stem 12 supported loosely in guide member 21 in outer end of cap 2, said stem 12 having graduating spring 13; and 8 denotes the emergency piston which operates the emergency valve 10, contiguous to which is the check valve 10ª.

Under emergency piston 8 is a chamber 25 that communicates with the brake cylinder, and also communicates through openings in bearing or support 9 with chamber 24 under the emergency valve 10. Arranged with the latter is a check valve 10ª having a winged stem 11 allowing brake pipe air to pass the valve into chamber 24 when check valve is lifted from its seat after valve 10 is opened. The passage 20 leads from chamber 5ª to cap 2 to convey air to chamber 19 and thence through ports 36 to piston 4. Brake pipe air enters the triple valve through these latter passages, then through feed groove 17, when open, to chamber 18 in which the slide valve operates, which connects with chamber 37, which is always in free communication with the auxiliary reservoir through opening 14, in which opening is the retarding block 16 and retarding spring 15, for retarded release.

In the emergency position and operation of these parts, as shown in Figure 1, which is all I need to describe, and that only briefly, inasmuch as my invention has chiefly to do with emergency applications, quick action is caused by a large reduction of pressure in the brake pipe below that in the auxiliary reservoir. This fall in brake pipe pressure causes the difference in pressure on the two sides of piston 4 to increase rapidly, so that the piston 4 compresses spring 13 and seats itself firmly against the end of the chamber 18. This movement of piston 4 causes rod 22 to move slide valve 3 and uncover port 35 in slide valve seat 28, and permit air from the auxiliary reservoir to flow to the top of emergency piston 8, forcing the latter down and opening emergency valve 10. The pressure in chamber 24 is thus relieved and air flows rapidly through chambers 25 and 24 to the brake cylinders. At the same time port 40 in the slide valve 3 registers with port 29 in slide valve seat and allows air from auxiliary reservoir to flow through it and port 26 to brake cylinder. At this time the port 41 running through the slide valve, the cavity 39 in said valve, the exhaust 30 in seat 28, the port 31 in seat 28, the port 34 in the seat 28, the ports 32 and 33 in the slide valve, and the cavity 23 in the graduating valve 7, though containing air, are not operative as in some of the other operations. The ports 34, 32, 23 and 33 are, however, in communication with chamber 24 and receiving pressure therefrom, see Figure 1, which might be drawn upon for use if desired, but which is not demanded as the port 33 is closed by the seat 28 in the triple I am describing as usually constructed. It is important in this connection to keep in mind the port 34 which leads to the check valve case and chamber 24. When the pressure in chamber 24 is relieved, as stated, brake pipe air will lift check valve 10ª, and the air will flow to the brake cylinder, until brake cylinder and brake pipe pressure nearly equalize, when check valve is forced to its seat by a spring, thus preventing brake cylinder pressure from escaping back into brake pipe again. It will be noted that I am describing the action of the parts in emergency only. I might go on at length and describe the action of all the ports, passages and mechanical members in service use for graduation, full release, charging, quick service, full service, on lap, retarded release, etc., but this is not necessary, as all these movements are well known, and their description here would have no bearing upon the explanation of my present invention.

Thus it will be seen that the supply of air from the brake pipe and the auxiliary reservoir will be instantaneously delivered to the brake cylinders when an emergency operation takes place, and in the ordinary use of triple valves this supply cannot be replaced until the recharging operation has time to do its work. My invention lies in the devising of means for immediately allowing a running feed while the brakes are set, and to do this I provide a feeding passageway. A running through the slide valve and slide valve seat from the slide valve port 33 to the chamber 25 below emergency piston 8; and this port A which has its mouth B discharging into chamber 25 takes pressure from the port 33, when the parts are in the position shown in Figure 1 of the drawing, the piston 4 being at the end of chamber 18 in full emergency, and delivers it into chamber 25, from which it feeds through opening at 27 into brake cylinder. It also feeds past the emergency piston 8, which is of less diameter than the bore of the housing it travels in in the slide valve seat casting 28, that is to say, as the passage A delivers pressure through its mouth B into chamber 25 under piston 8, the air will flow through the annular space surrounding said piston 8 and then through passage 35 to the auxiliary reservoir space.

Therefore, it is clearly seen that by the simple expedient of inserting the port A in the parts as specified, I tap a large source of pressure, not heretofore utilized at such a time, and control and deliver such pressure to the brake cylinders and auxiliary reservoirs while the brakes are set, so that there is plenty of pressure on hand at all times for any use, the pressure thus being restored for use even right after emergency. This subdues any wave action after emergency. The engineer has a supply always on hand. The cylinders are equally charged, and a much smoother release is effected, and the jerky motion is eliminated. The feed passageway A may be made any suitable size, and as the pressure is delivered to both sides of the piston 8, no undesired movement can take place. When an emergency application is made, the piston which moves the graduation valve causes the latter to connect with the feed passageway so as to allow the air to flow to brake cylinders and auxiliary reservoirs, which will continue until equalization takes place, or can be checked at the will of the engineer. At that instant the expansion of the graduating spring moves the graduating valve and closes the passageway as shown in Figure 2. From this point more pressure may be graduated as far as desired, it being understood that no wave of the same energy can overtake the preceding wave, as the numerous ventings in the brake pipe at this time modify all detrimental wave action.

Many other advantages accruing from the use of this passageway will be evident to those familiar with the art and need not be described here, as they will be obvious upon inspection; and it will also be apparent that many changes in the detailed form of the passageway and its location may be made without exceeding the scope of my invention.

As a further explanation of the operation it may be stated that at the time that emergency action takes place in the first triple on the train, the engineer's valve should be brought back to running position, or to full release position, as the case may require, thus reinforcing more rapidly the pressure. At this point is where the subduing of air waves counts.

Having thus described my invention, what I claim as new and desire to secure by Letters Patent, is:

1. In a fluid pressure brake mechanism, the combination with a triple-valve casing, piston, slide valve, graduation valve, slide valve seat, emergency piston and valve arranged with chambers on both sides of said piston, of means consisting of a feeding passageway for conveying pressure from brake pipe to one side of the emergency piston after an emergency application has been made and brakes are set and quickly restoring the pressure in auxiliary reservoir and brake cylinders.

2. In a fluid pressure brake mechanism, a triple valve having connections with train pipe, brake cylinder and auxiliary reservoir, and having a graduation valve, slide valve, emergency valve, and means for operating same for emergency application of the brakes, in combination with a running feed operative instantaneously when the brakes are set for emergency use, to restore pressure for immediate use.

3. In a fluid pressure brake mechanism, a triple valve having connections with train pipe, brake cylinder and auxiliary reservoir and having a graduation valve, slide valve, emergency valve, and means for operating same for emergency application of the brakes, in combination with a running feed operative instantaneously when the brakes are set for emergency use, to restore pressure for immediate use, said running feed consisting of a port leading from the graduation valve to the emergency valve.

4. In a fluid pressure brake mechanism, a triple valve having connections with train pipe, brake cylinder and auxiliary reservoir, and having a graduation valve, slide valve, emergency valve, and means for operating same for emergency application of the brakes, in combination with a running feed operative instantaneously when the brakes are set for emergency use, to restore pressure for immediate use, said running feed consisting of a port running through the slide valve and the slide valve seat to the chamber below emergency valve.

5. In an air brake mechanism, an emergency piston and valve, auxiliary reservoir, brake cylinder and train pipe, with communicating chambers on opposite sides of the emergency valve, and a passage for carrying train pipe air to the chamber below the emergency piston, when emergency action has taken place and brakes are set, said passage acting to instantaneously restore a working pressure.

6. In a fluid pressure brake mechanism, a triple valve device provided with a feed passage operative after emergency while brakes are set to restore pressure to auxiliary reservoirs and brake cylinders by controlling and delivering a new supply of operating pressure to the chamber below the emergency valve and thence to auxiliary reservoirs and brake cylinders.

7. In a fluid pressure brake mechanism, a triple valve device, having a graduation valve, slide valve, operating piston therefor, and emergency piston and valve, of means for carrying a supply of new pressure to the reservoir and cylinders while brakes are set in emergency action.

8. In a fluid pressure brake mechanism, the combination with a triple valve structure having connection with brake cylinders, brake pipe and auxiliary reservoir, of an emergency piston, an emergency valve operable thereby, a graduation valve, a slide valve and a slide valve seat, these parts having suitable ports and passages for service and emergency applications of the brakes, and means consisting of a feed passage leading from a slide valve port which is in communication with train pipe air at the time of emergency, said feed passage running through the slide valve, and a feed passage running through the slide valve seat to the chamber below the emergency valve and coinciding with the first mentioned feed passage when the parts are in emergency position so that the pressure in brake cylinders and auxiliary reservoirs, when depleted by emergency use, may be instantly restored.

9. In a device of the character described, a triple valve combined with a brake cylinder, auxiliary reservoir and brake pipe, of emergency members, an operating piston, and means for carrying brake pipe air to the auxiliary reservoir and brake cylinder at the time of an emergency action, said means consisting of ports in the slide valve and slide valve seat, which ports coincide in recharging the restored pressure, but are disconnected at other times.

In testimony whereof I hereunto affix my signature.

EDWARD G. SHORTT.